United States Patent
MacKinnon et al.

(10) Patent No.: US 8,008,404 B2
(45) Date of Patent: Aug. 30, 2011

(54) COMPOSITE MEMBRANE

(75) Inventors: Sean M MacKinnon, Fairport, NY (US); Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 236 days.

(21) Appl. No.: 12/434,757

(22) Filed: May 4, 2009

(65) Prior Publication Data

US 2009/0280382 A1 Nov. 12, 2009

Related U.S. Application Data

(60) Provisional application No. 61/052,145, filed on May 9, 2008.

(51) Int. Cl.
C08F 214/14 (2006.01)

(52) U.S. Cl. .................. 525/326.2; 526/250; 526/252; 526/253; 526/254; 525/199; 525/200

(58) Field of Classification Search .................. 525/199, 525/200, 326.2; 526/250, 252, 253, 254
See application file for complete search history.

(56) References Cited

U.S. PATENT DOCUMENTS

| | | | |
|---|---|---|---|
| 5,006,408 A * | 4/1991 | Green et al. .................. 428/395 |
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 | 8/2001 | Hamrock et al. | |
| 6,444,343 B1 | 9/2002 | Prakash et al. | |
| 6,523,699 B1 | 2/2003 | Akita et al. | |
| 6,559,237 B1 | 5/2003 | Mao et al. | |
| 6,847,518 B2 | 1/2005 | Fukuda et al. | |
| 6,875,537 B2 | 4/2005 | Tani et al. | |
| 6,926,984 B2 | 8/2005 | Asano et al. | |
| 6,933,068 B2 | 8/2005 | Asano et al. | |
| 6,953,653 B2 | 10/2005 | Smith et al. | |
| 6,986,962 B2 | 1/2006 | Oyanagi et al. | |
| 7,001,929 B2 | 2/2006 | Goto et al. | |
| 7,045,241 B2 | 5/2006 | Akita et al. | |
| 2001/0018144 A1 | 8/2001 | Watakabe et al. | |
| 2002/0014405 A1 | 2/2002 | Arcella et al. | |
| 2003/0017379 A1 | 1/2003 | Menashi | |
| 2004/0214058 A1 | 10/2004 | Tada et al. | |
| 2004/0214065 A1 | 10/2004 | Kanaoka et al. | |
| 2005/0014927 A1 | 1/2005 | Akita | |
| 2005/0043487 A1 | 2/2005 | Felix et al. | |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |
| 2006/0177719 A1 | 8/2006 | Fuller et al. | |
| 2007/0042242 A1 | 2/2007 | Tada et al. | |
| 2007/0099054 A1 | 5/2007 | Fuller et al. | |
| 2007/0141237 A1 | 6/2007 | Okiyama et al. | |
| 2008/0027152 A1 * | 1/2008 | Maier et al. ..................... 521/25 |
| 2009/0278083 A1 | 11/2009 | Fuller et al. | |
| 2009/0278091 A1 | 11/2009 | MacKinnon et al. | |
| 2009/0281245 A1 | 11/2009 | MacKinnon et al. | |
| 2009/0281262 A1 | 11/2009 | MacKinnon et al. | |
| 2009/0281270 A1 | 11/2009 | Fuller et al. | |

FOREIGN PATENT DOCUMENTS

| | | |
|---|---|---|
| JP | 2003535929 T | 12/2003 |
| JP | 2005129298 A | 5/2005 |
| JP | 2005166557 A | 6/2005 |
| JP | 20050179380 A | 7/2005 |
| JP | 2009 249 487 A | 10/2009 |
| WO | 2004/051776 | 6/2004 |
| WO | 2007/052954 A1 | 5/2007 |

OTHER PUBLICATIONS

Smith, D.W. et al., "Perfluorocyclobutane Aromatic Polyethers. Synthesis and Characterization of New Siloxane-Containing Fluoropolymers," Macromolecules 1996, v. 29, pp. 852-860.

Smith, D.W. et al., "Perfluorocyclobutane (PFCB) polyaryl ethers: versatile coatings material," J. of Fluorine Chem., v. 104, pp. 109-117 (2000).

Souzy, R. et al., "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

* cited by examiner

Primary Examiner — Bernard Lipman
(74) Attorney, Agent, or Firm — Brooks Kushman P.C.

(57) ABSTRACT

A composite membrane for fuel cell applications includes a support substrate with a predefined void volume. The void volume is at least partially filled with an ion conducting polymer composition. Characteristically, the ion conducting polymer composition includes a first polymer with a cyclobutyl moiety and a second polymer that is different than the first polymer.

11 Claims, 3 Drawing Sheets

COMPOSITE MEMBRANE

CROSS-REFERENCE TO RELATED APPLICATIONS

This application claims the benefit of U.S. provisional application Ser. No. 61/052,145, filed May 9, 2008.

BACKGROUND OF THE INVENTION

1. Field of the Invention

The present invention relates to ion conductive polymers, fuel cell membranes and membrane electrode assemblies.

2. Background Art

Proton conductive polymer membranes are an important component in a fuel cell device. To achieve optimal fuel cell performance, the proton conductive polymer membrane must maintain a high ionic conductivity and mechanical stability at high and low relative humidity. Aromatic perfluorocyclobutane random copolymers have been disclosed in U.S. Pat. No. 6,559,237 as improved membrane materials for fuel cells. Due to the chain configuration of random copolymers, however, water swelling at high humidity and membrane shrinking at low humidity are common problems with random copolymers. A random copolymer membrane lacks the mechanical robustness to withstand the rigors of hydration and dehydration within an operating fuel cell.

Accordingly, there is a need to provide a further improved proton conductive polymer membrane that maintains robust mechanical properties and high ionic conductivity at wide range of humidity conditions.

SUMMARY OF THE INVENTION

The present invention solves one or more problems of the prior art by providing in at least one embodiment a composite ion-conducting membrane that is useful for fuel cell application. The composite membrane of the present embodiment includes a support structure having a predetermined void volume. A polymeric electrolyte composition contacts the support structure. The polymeric electrolyte composition includes a first polymer having a perfluorocyclobutyl moiety and a second polymer that is different than the first polymer.

In another embodiment of the present invention, a method of forming the composite membrane set forth above is provided. The method of this embodiment comprises a step in which a support structure is contacted with a first polymer-containing solution. The support structure is formed from a polymer and has a predetermined porosity such that the first polymer-containing solution penetrates into interior regions of the support structure defined by the predetermined porosity. The first polymer-containing solution coats at least a portion of the interior regions to form a first coated support structure. The first coated support structure is coated with a second polymer-containing solution that penetrates into interior regions of the first polymer-coated support structure to form a second coated support structure. Penetration of the second polymer-containing solution is enhanced by the first ionomer solution as compared to a support structure that is not coated by the first ionomer solution. Finally, solvent is removed from the second coated support structure to form the composite membrane.

In another embodiment of the present invention, a method of forming the composite membrane set forth above is provided. The method of this embodiment comprises a step in which a support structure is contacted with a polymer-containing solution. The support structure is formed from a polymer and has a predetermined porosity such that the first polymer-containing solution penetrates into interior regions of the support structure defined by the predetermined porosity. Typically, the first polymer of the first polymer-containing composition includes a perfluorocyclobutyl moiety. The first polymer-containing solution coats at least a portion of the interior regions to form a coated support structure. Finally, solvent is removed from the coated support structure to form the composite membrane.

It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Figure 1:
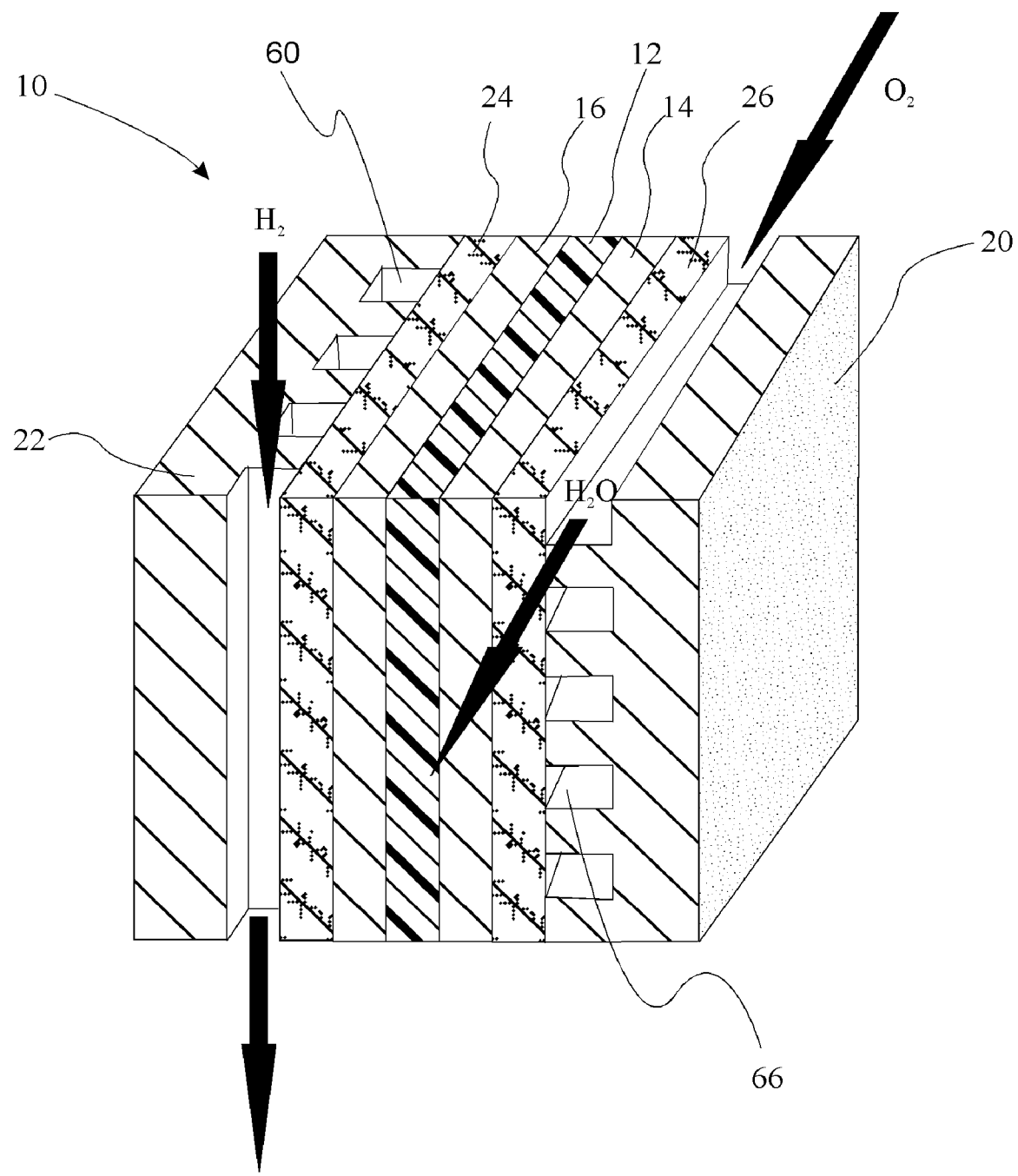
FIG. 1 provides a schematic illustration of a fuel cell incorporating the polymers of an embodiment of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," "block", "random," "segmented block," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The following description of the embodiment(s) is merely exemplary in nature and is in no way intended to limit the invention, its application, or uses.

The term "block" as used herein means a portion of a macromolecule, comprising many constitutional units, that has at least one feature that is not present in adjacent portions.

The term "block macromolecule" as used herein means a macromolecule that is composed of blocks in linear sequence.

The term "block polymer" as used herein means a substance composed of block macromolecules.

The term "block copolymer" as used herein means a polymer in which adjacent blocks are constitutionally different, i.e., each of these blocks comprises constitutional units derived from different characteristic species of monomer or with different composition or sequence distribution of constitutional units.

The term "random copolymer" as used herein means a copolymer consisting of macromolecules in which the probability of finding a given repeating unit at any given site in the chain is independent of the nature of the adjacent units.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive composite membrane 12 includes one or more of the polymers set forth below. Fuel cell 10 also includes conductive plates 20, 22, gas channels 60 and 66, and gas diffusion layers 24 and 26. Advantageously, the present invention provides embodiments for composite membrane 12.

Figure 2:
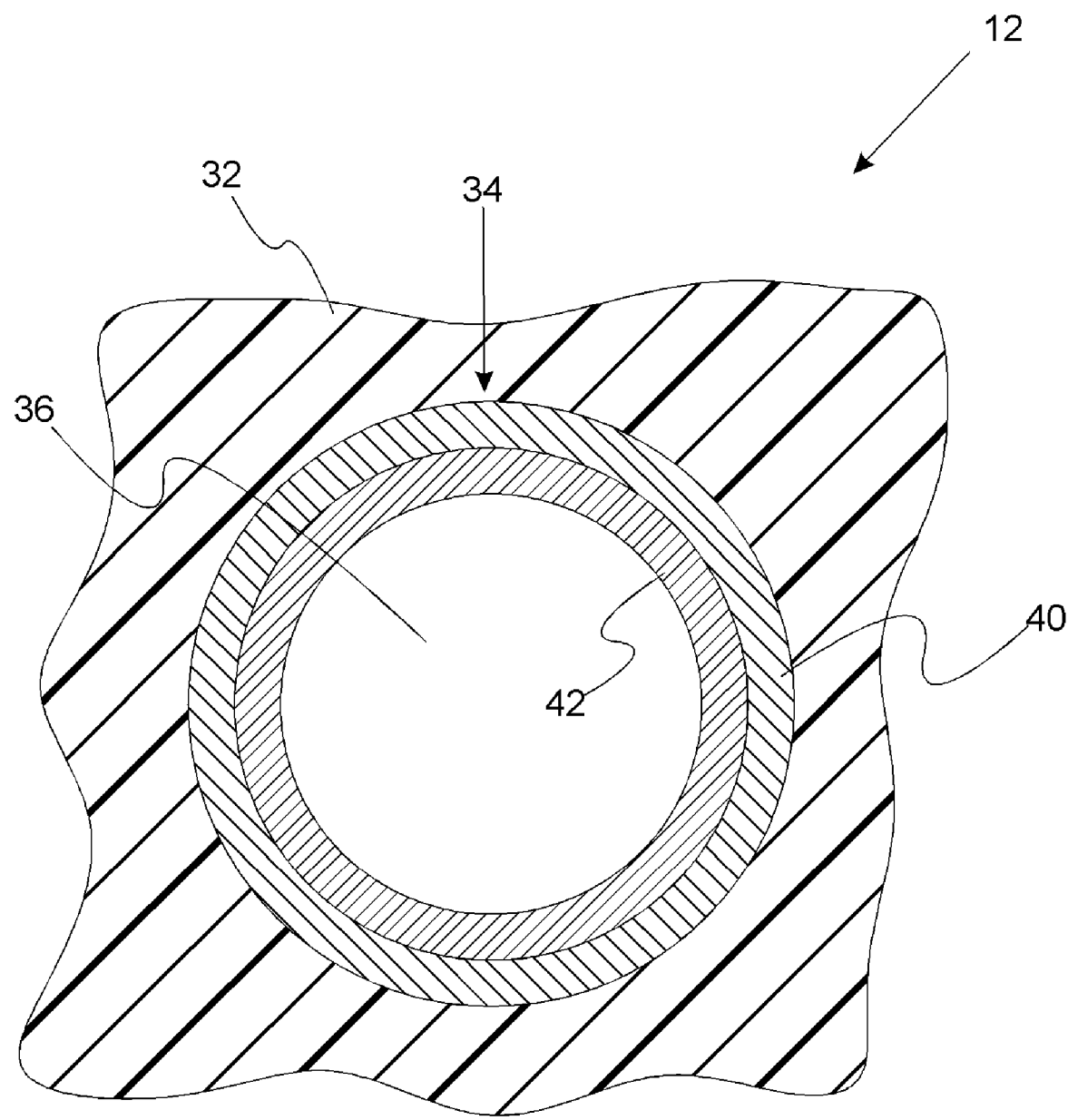
FIG. 2 is a cross-section of a portion of an embodiment of a composite membrane.

In an embodiment of the present invention, a composite membrane for use in an electrochemical cell is provided. FIG. 2 provides a cross-section of a portion of the composite membrane with a single void depicted therein. Composite membrane 12 includes support structure 32 having a predetermined void volume. Typically, the void volume is from 30 volume percent to 95 volume percent of the total volume of support structure 32. Support structure 32 may be formed from virtually any polymeric material having the requisite void volume. Expanded polytetrafluoroethane is particularly useful for this application. Polymeric electrolyte composition 34 contacts support structure 32. Polymeric electrolyte composition 34 includes a first polymer having a perfluorocyclobutyl moiety. In a refinement, polymeric electrolyte composition 34 also includes a second polymer that is different than the first polymer. In a refinement, at least 50 percent of the void volume includes polymeric electrolyte composition 34, i.e., is filled with the polymeric electrolyte composition.

Still referring to FIG. 2, composite membrane 12 is formed by contacting support structure 32 with a first polymer-containing solution. In a variation of the present embodiment, the first polymer-containing solution contains a sulfonated-perfluorocyclobutane polymer and a suitable solvent. Examples of such solvents include alcohols, water, etc. In a refinement, the first polymer-containing solution comprises an ionomer in an amount from about 0.1 weight percent to about 5 weight percent of the total weight of the first ionomer solution. In another refinement, the first polymer-containing solution comprises an ionomer in an amount from about 0.5 weight percent to about 2 weight percent of the total weight of the first ionomer solution. The first polymer-containing solution penetrates into interior regions of support structure 32 such as void 36. At least a portion of the interior regions are coated with the first polymer-containing solution to form the first coated support structure. The first coated support structure is subsequently coated with a second polymer-containing solution that penetrates into interior regions of the coated support structure to form a second coated support structure. Penetration of the second polymer-containing solution is enhanced by the first polymer-containing solution as compared to a supported structure or support membrane that is not coated by the first polymer-containing solution. Solvent(s) are then removed from the ionomer coated support membrane to form composite membrane 12. Therefore, composite membrane 12 includes first layer 40, which contacts at least a portion of support structure 32 and is disposed over a portion of the void volume such as void 36. First layer 40 comprises residues of the first polymer-containing solution. Composite membrane 12 also includes second layer 42 contacting at least a portion of the first layer. Second layer 42 comprises residues of a second polymer-containing solution.

As set forth above, the composite membrane includes a first polymer that includes a cyclobutyl moiety. In a variation, the first polymer includes a sulfonated-perfluorocyclobutane polymer. The first polymer is applied within the first ionomer solution. Ideally, the void volume 36 is completely filled with ionomer after drying.

As set forth above, the composite membrane includes a second polymer that is different than the first polymer. In a variation, the second polymer comprises a non-ionic polymer. Examples of such non-ionic polymers include, but are not limited to, fluoropolymers. In one refinement, the second polymer also includes a perfluorocyclobutyl moiety. Other examples of the second polymer include ionic polymers such as, but not limited to, sulfonated-poly(arylene ether ketone), sulfonated-poly(phenylene), poly(perfluoroalkylperfluoroalkylether sulfonic acid), and combinations thereof.

As set forth above, the first polymer includes cyclobutyl moiety. Suitable polymers having cyclobutyl moieties are disclosed in U.S. Pat. Pub. No. 20070099054, the entire disclosure of which is hereby incorporated by reference. In variation of the present invention, the first polymer comprises polymer segments 1 and 2:

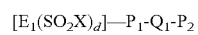

$$[E_1(SO_2X)_d] - P_1 - Q_1 - P_2 \qquad 1$$

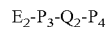

$$E_2 - P_3 - Q_2 - P_4 \qquad 2$$

wherein:

$E_1(SO_2X)_d$ is a sulfonated aromatic containing moiety;

$E_1$ is an aromatic containing moiety;

$E_2$ is an unsulfonated aromatic-containing and/or aliphatic-containing moiety;

X is an —OH, a halogen, an ester, or

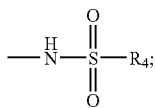

d is the number of $(SO_2X)_d$ attached to $E_1$. In one refinement, d is equal to the number of aromatic rings in $E_1$. In another refinement, each aromatic ring in $E_1$ can have 0, 1, 2, 3, or 4 $SO_2X$ groups;

$P_1$, $P_2$, $P_3$, $P_4$ are each independently: absent, —O—, —S—, —SO—, —CO—, —SO$_2$—, —NR$_1$H—, NR$_2$—, or —R$_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$, $Q_2$ are each independently a fluorinated cyclobutyl moiety.

In another variation of the present embodiment, the first polymer comprises segments 3 and 4:

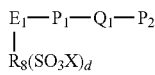

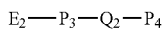

wherein:

$E_1$, $E_2$ are each independently an aromatic-containing and/or aliphatic-containing moiety;

X is an —OH, a halogen, an ester, or

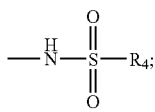

d is the number of $(SO_2X)_d$ attached to $E_1$. In one refinement, d is equal to the number of aromatic rings in $E_1$. In another refinement, each aromatic ring in $E_1$ can have 0, 1, 2, 3, or 4 $SO_2X$ groups. In still another refinement, d is an integer from 1 to 4 on average;

$P_1$, $P_2$, $P_3$, $P_4$ are each independently: absent, —O—, —S—, —SO—, —CO—, —SO$_2$—, —NH—, NR$_2$—, or —R$_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(SO_2X)_d$ is a sulfonated aliphatic or aromatic containing moiety. In a refinement, $R_8$ is $C_{1-25}$ alkylene, $C_{1-25}$ perfluoroalkylene, perfluoroalkyl ether, alkylether, or $C_{1-25}$ arylene; and $Q_1$, $Q_2$ are each independently a fluorinated cyclobutyl moiety.

In another variation of the present embodiment, the first polymer comprises segments 5 and 6:

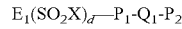

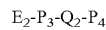

connected by a linking group $L_1$ to form polymer units 7 and 8:

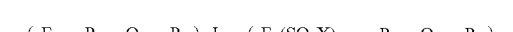

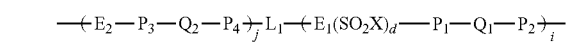

wherein:

$E_1(SO_2X)_d$ is a sulfonated aromatic-containing moiety;

$E_2$ is an unsulfonated aromatic-containing and/or aliphatic-containing moiety;

$L_1$ is a linking group;

X is an —OH, a halogen, an ester, or

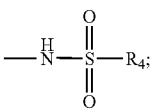

d is a number of $(SO_2X)$ functional groups attached to $E_1$;

$P_1$, $P_2$, $P_3$, $P_4$ are each independently absent, —O—, —S—, —SO—, —SO$_2$—, —CO—, —NH—, NR$_2$—, —R$_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$Q_1$, $Q_2$ are each independently a fluorinated cyclobutyl moiety;

i is a number representing the repetition of polymer segment 1. Typically, i is from 1 to 200; and, j is a number representing the repetition of a polymer segment 2. Typically, j is from 1 to 200.

In still another variation of the present embodiment, the first polymer comprises polymer segments 9 and 10:

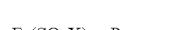

wherein:

$E_1$, $E_2$ is an aromatic or aliphatic-containing moiety wherein at least one of $E_1$ and $E_2$ include an aromatic group substituted with —SO$_2$X;

X is an —OH, a halogen, an ester, or

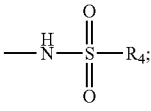

d is the number of $(SO_2X)$ functional groups attached to $E_1$;

In one refinement, d is equal to the number of aromatic rings in $E_1$. In another refinement, each aromatic ring in $E_1$ can have 0, 1, 2, 3, or 4 SO$_2$X groups. In still another refinement, d is an integer from 1 to 4 on average;

f is the number of (SO$_2$X) functional groups attached to E$_2$; In one refinement, f is equal to the number of aromatic rings in E$_2$. In another refinement, each aromatic ring in E$_2$ can have 0, 1, 2, 3, or 4 SO$_2$X groups. In still another refinement, f is an integer from 1 to 4 on average;

P$_1$, P$_2$, P$_3$ are each independently absent, —O—, —S—, —SO—, —SO$_2$—, —CO—, —NH—, NR$_2$—, —R$_3$—, and R$_2$ is C$_{1\text{-}25}$ alkyl, C$_{1\text{-}25}$ aryl or C$_{1\text{-}25}$ arylene;

R$_3$ is C$_{1\text{-}25}$ alkylene, C$_{1\text{-}25}$ perfluoroalkylene, perfluoroalkyl ether, alkyl ether, or C$_{1\text{-}25}$ arylene;

R$_4$ is trifluoromethyl, C$_{1\text{-}25}$ alkyl, C$_{1\text{-}25}$ perfluoroalkylene, C$_{1\text{-}25}$ aryl, or another E$_1$ group; and Q$_1$ is a fluorinated cyclobutyl moiety, with the proviso that when d is greater than zero, f is zero and when f is greater than zero d is zero.

Example for Q1 and Q2 in the above formulae are:

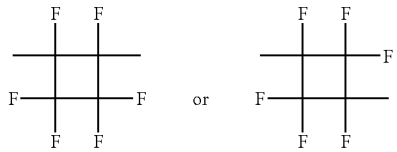

In each of the formulae 1-10, E$_1$ and E$_2$ include one or more aromatic rings. For example, E$_1$ and E$_2$, include one or more of the following moieties:

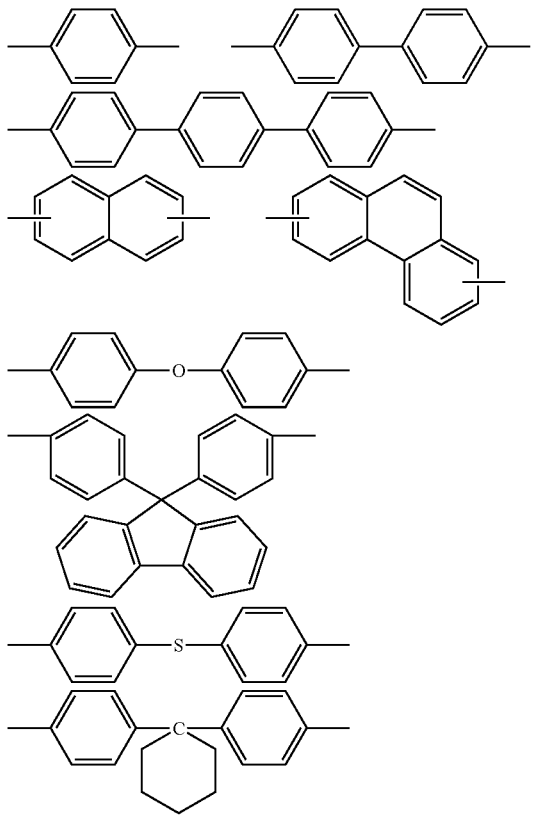

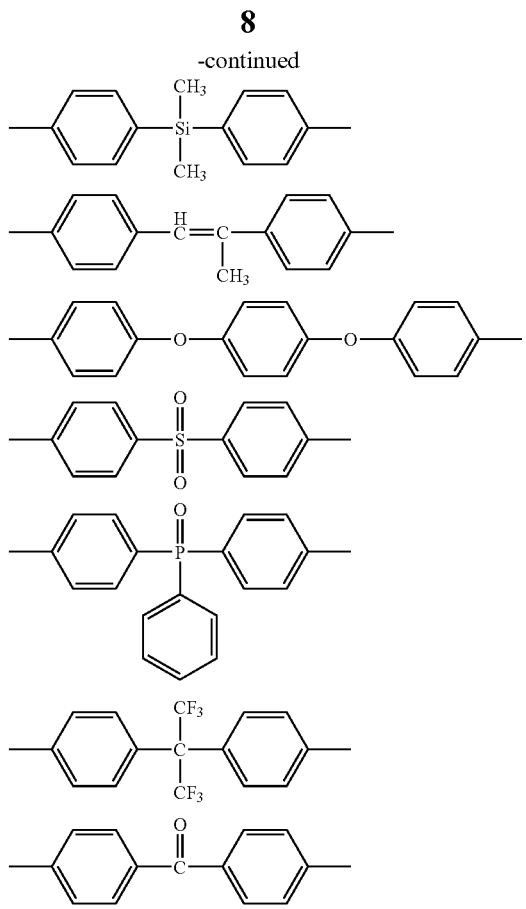

Examples of L$_1$ include the following linking groups:

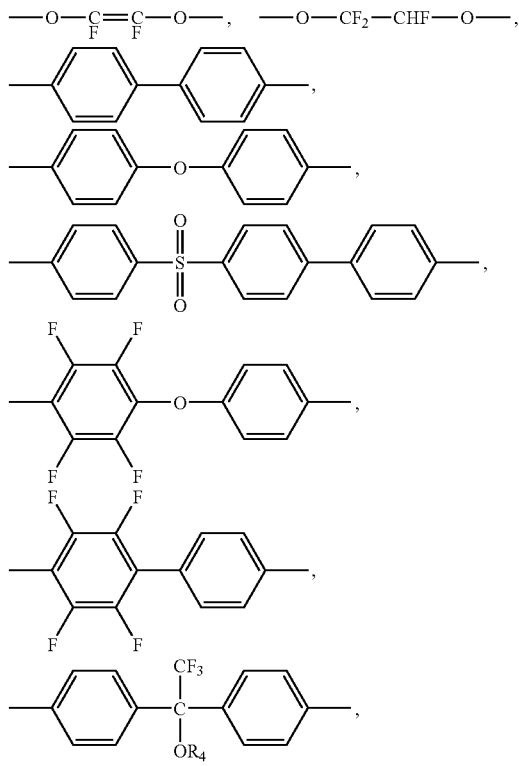

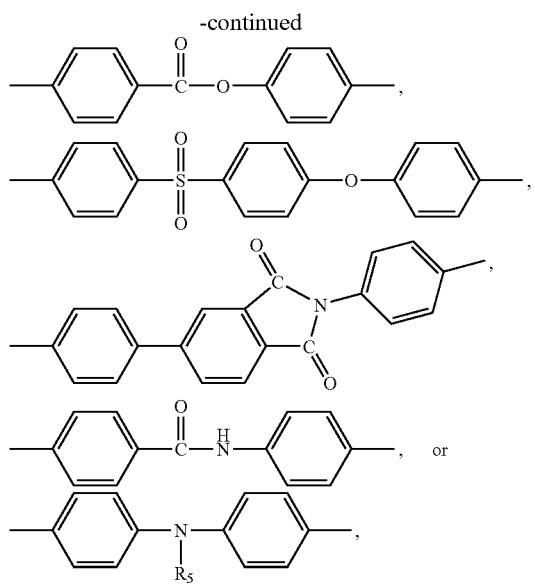

where $R_5$ is an organic group, such as an alkyl or acyl group.

In another embodiment, a composite membrane for use in an electrochemical cell is provided. The composite membrane of this embodiment includes a support structure having a predetermined void volume; and a polymeric composition contacting the support structure. The polymeric electrolyte composition comprises an alcoholic solution of a perfluorosulfonic acid polymer as set forth above. At least 50 percent of the void volume includes a portion of the polymeric electrolyte composition.

In another embodiment of the present invention, a method of forming the composite membrane set forth above is provided. The method of this embodiment comprises a step in which a support structure is contacted with a first polymer-containing solution. The support structure is formed from a polymer and has a predetermined porosity such that the first polymer-containing solution penetrates into interior regions of the support structure defined by the predetermined porosity. The first polymer-containing solution coats at least a portion of the interior regions to form a first coated support structure. The first coated support structure is coated with a second polymer-containing solution that penetrates into interior regions of the first polymer-coated support structure to form a second coated support structure. Penetration of the second polymer-containing solution is enhanced by the first ionomer solution as compared to a support structure that is not coated by the first ionomer solution. Finally, a solvent composition is removed from the second coated support structure to form the composite membrane. In one refinement, the solvent composition comprises a polar solvent. In another refinement, the solvent composition comprises a component selected from the group consisting of alcohol (e.g., methanol, ethanol, propanol, etc), N,N-dimethylacetamide, and combinations thereof.

In another embodiment, a composite membrane for use in an electrochemical cell is provided. The composite membrane comprises a support structure having a predetermined void volume and a polymeric composition contacting the support structure. The polymeric electrolyte composition comprises a first alcohol containing solution of perfluorosulfonic acid polymer and a second polymer selected from the group consisting of sulfonated poly(arylene ether ketone), sulfonated poly(phenylene), poly(perfluoroalkyl-perfluoroalkylether sulfonic acid), sulfonated perflurocyclobutane containing polymer, and combinations thereof.

In another embodiment of the present invention, a method of forming the composite membrane set forth above is provided. The method of this embodiment comprises a step in which a support structure is contacted with a polymer-containing solution. The support structure is formed from a polymer and has a predetermined porosity such that the first polymer-containing solution penetrates into interior regions of the support structure defined by the predetermined porosity. The first polymer-containing solution coats at least a portion of the interior regions to form a coated support structure. Finally, solvent is removed from the coated support structure to form the composite membrane. In one refinement, the solvent composition comprises a polar solvent. In another refinement, the solvent composition comprises a component selected from the group consisting of alcohol (e.g., methanol, ethanol, propanol, etc), N,N-dimethylacetamide, and combinations thereof The following examples describe how to make polyelectrolyte fuel cell membranes by coating ionomer solutions in N,N-dimethylacetamide into expanded polytetrafluoroethylene (ePTFE) support structures such as Donaldson 1326. Ionomers, in addition to sulfonated-perfluorocyclobutane polymers that are successfully imbibed into ePTFE support structures include sulfonated-poly(arylene ether ketone), sulfonated-poly(phenylene), and Nafion® 1000.

Sulfonated Poly(Arylene Ether Ether Ketone) in an Expanded Polytetrafluoro-ethylene Support Structure. Sulfonated poly(arylene ether ketone) with an ion exchange capacity of 2-milliequivalents $H^+$ per gram of resin solids (1 gram, Scientific Polymer Products, Ontario, N.Y.) in N,N-dimethylacetamide (9 grams) is filtered through a 5-micrometer Millipore Teflon® filter. The solution is centrifuged at 2500-revolutions per minute for 10 minutes and then a drop of this solution is applied to a porous, expanded-tetrafluoroethylene (ePTFE) support (Donaldson 1326) that is stretched evenly over a piece of windowpane glass. The droplet of polymer solution failed to wet the ePTFE-material within 30-minutes as evidenced by the spheroidal droplet of the polymer solution that remained intact on the surface of the support and that is not absorbed by the ePTFE support. A piece of ePTFE support (Donaldson 1326) is treated as follows with a 1-mass % solids solution of a poly[block-(sulfonated-polyperfluorocyclobutane-biphenyl ether)-co-block-(polyperfluorocyclobutane-hexafluoroisopropylidene-bisphenol)] (with an ion exchange capacity of 1.83 meq. $H^+$ per gram of resin solids) dissolved in a 1:1:1-mass ratio of ethanol, isopropanol and water. The solution of the block copolymer in aqueous, isopropanol and ethanol is applied as a uniform wet film layer onto windowpane glass with a Bird applicator bar having a 0.006-inch wet film gap. A piece of uniformly stretched ePTFE support (Donaldson 1326) is then lowered evenly and allowed to contact the wet diblock copolymer film. The ePTFE support structure immediately became wet with the coating solution as evidenced by the white, opaque, ePTFE support that instantly turned clear and transparent. After the solvent is evaporated, the ePTFE support layer became opaque again. A solution of the filtered sulfonated poly(arylene ether ketone) in N,N-dimethylacetamide is then coated on top of the ePTFE support using a Bird applicator bar with a 200-micrometer coating gap. The ePTFE structure immediately became transparent and the wet-film coating on glass is heated at 80° C. on a heated platen for 30 minutes. The resultant supported membrane film remained transparent and is 20-micrometers thick. The supported film is removed from the glass by immersion in water, and then the freestanding, transparent film with an ionomer-filled ePTFE layer is used as a polyelectrolyte membrane in a humidified, hydrogen-air fuel cell that is operated at less than 80° C.

Sulfonated-Poly(phenylene) in an Expanded Polytetrafluoroethylene Support Structure. Parmax 1200® (Mississippi Polymer Technology, now Solvay-Solexis) in methylene chloride (10 wt. % solids) is applied as a wet film to glass windowpane with a Bird applicator bar having a 0.006-inch coating gap. After air-drying, the film is removed from the glass with water and is then dried at 80° C. in a forced-air oven for 16 hours. Two grams of the film are suspended in 30%-oleum (20 milliliters) by stirring with the use of a glass rod before being enclosed in a glass jar with a Teflon® screw-cap lid. The black mixture is then roll-milled for 48 hours. The resultant viscous solution is added to deionized water (2-liters), and the green strands of coagulated polymer are isolated by filtration, washed with water, and then chopped with a minimum amount of water using a Waring blender. The chopped green polymer is filtered, washed extensively with water, and then air-dried to yield a red powder (2 grams) with an ion exchange capacity of 2-milliequivalents $H^+$ per gram of resin solids. The powder (1 gram) in N,N-dimethylacetamide (19 grams) is filtered through a 5-micrometer Millipore Teflon® filter. The orange solution is centrifuged at 2500-revolutions per minute for 10 minutes and then a drop of this solution is applied to a porous, expanded-polytetrafluoroethylene (ePTFE) support (Donaldson 1326) that is stretched evenly over a piece of windowpane glass. The droplet of polymer solution failed to wet the ePTFE-material within 30-minutes as evidenced by the spheroidal droplet of the polymer solution that remained intact on the surface of the support and that is not absorbed by the ePTFE support. A piece of ePTFE support (Donaldson 1326) is treated as follows with a 1 wt. % solids solution of a copolymer of poly[block-(sulfonated-polyperfluorocyclobutane-biphenyl ether)-co-block-(polyperfluorocyclobutane-hexafluoroisopropylidene-bisphenol)] (with an ion exchange capacity of 1.83 meq. $H^+$ per gram of resin solids) in a 1:1:1-mass ratio of ethanol, isopropanol and water. The solution of the block copolymer in aqueous, isopropanol and ethanol is applied as a uniform wet film layer onto windowpane glass with a Bird applicator bar having a 0.006-inch wet film coating gap. A piece of uniformly stretched ePTFE support (Donaldson 1326) is then lowered evenly and allowed to contact the wet diblock-polymer film. The ePTFE support structure instantly became wetted by the coating solution as evidenced by the white opaque, ePTFE support that immediately became clear and transparent. After the solvent is evaporated, the ePTFE support layer became opaque again. A solution of the filtered sulfonated-polyphenylene in N,N-dimethylacetamide is then coated on top of the ePTFE support using a Bird applicator bar with a 275-micrometer coating gap. The ePTFE structure immediately became transparent and the wet-ePTFE-supported film coated on glass is heated to 80° C. on a heated platen for 30 minutes. The resultant supported membrane film remained transparent and is 20-micrometers thick. The transparent supported film is used as a polyelectrolyte membrane in a humidified hydrogen-air fuel cell operated at less than 95° C.

Nafion 1000® in an Expanded Polytetrafluoroethylene Support Structure. Nafion® 1000 dispersion in 60-mass %-water, 40-mass % 1-propanol (20 grams, DuPont) is placed in an eight inch square Pyrex® baking dish and heated in a forced-air oven at less than 80° C. until a dry film is formed. The film readily dissolved in N,N-dimethylacetamide at 15-wt. % solids and is centrifuged at 2500-revolutions per minute for 10 minutes. When a drop of this solution is applied to a porous, expanded-tetrafluoroethylene (ePTFE) support (Donaldson 1326) that has been stretched evenly over a piece of windowpane glass, the droplet of polymer solution failed to wet the ePTFE-material within 30-minutes as evidenced by the spheroidal droplet of the polymer that remained intact on the surface of the support and that is not absorbed by the ePTFE support. A piece of ePTFE support (Donaldson 1326) is treated as follows with a 1-mass % solids solution of a poly[block-(sulfonated-polyperfluorocyclobutane-biphenyl ether)-co-block-(polyperfluorocyclobutane-hexafluoroisopropylidene-bisphenol)] (with an ion exchange capacity of 1.83 meq. $H^+$ per gram of resin solids) in a 1:1:1-mass ratio of ethanol, isopropanol and water. The solution of the block copolymer in aqueous, isopropanol and ethanol is applied as a uniform wet film layer onto windowpane glass with a Bird applicator bar having a 0.006-inch wet film gap. A piece of evenly stretched ePTFE support (Donaldson 1326) is then lowered evenly and allowed to contact the wet diblock copolymer film. The ePTFE support structure immediately became wet with the coating solution as evidenced by the white opaque, ePTFE support that instantly turned clear and transparent. After the solvent is evaporated, the ePTFE support layer became opaque again. A 15-wt. % solids solution of the Nafion® 1000 in N,N-dimethylacetamide is then coated on top of the ePTFE support using a Bird applicator bar with a 200-micrometer coating gap. The ePTFE structure immediately became transparent and the wet-film coated glass is heated at 80° C. on a heated platen for 30 minutes. The coated glass plate is then transferred to a forced-air oven and then is heated at 130° C. for four hours. The resultant supported membrane film remained transparent and is 20-micrometers thick. The supported film is removed from the glass by immersion in water, and then the freestanding, transparent film with ionomer-filled ePTFE layer is used as a polyelectrolyte membrane in a humidified, hydrogen-air fuel cell that is operated at less than 100° C.

Alternative Casting Process. Membranes may also be cast through various methods. For example, double coats have been prepared by removing a treated ePTFE support from the windowpane glass and; (i) coating the first ionomer layer onto the glass film, (ii) lowering a uniformly stretched ePTFE support to contact the first wet ionomer layer, (iii) subsequent coating of a second ionomer layer onto the surface of the ePTFE and (iv) allowing the membrane to dry to form a clear, transparent, reinforced composite membrane. Furthermore, composite membranes containing multiple supports can be prepared by continuing to overlay treated ePTFE supports onto subsequent wet ionomer coatings, followed by an overcoat.

The method of performing multiple coatings to prepare composite membranes allows for the simple incorporation of different ionomers forming asymmetric films. For example, different layers of ionomer and rubber (e.g., Arkema Kynar Flex®) mass fractions and additives may be placed and cast as anode or cathode specific.

PEM Volume Swell and Dimensional Change. The physical properties of the composite membranes are evaluated by measuring the corresponding dimensional change and mass uptake in boiling and room temperature water over a period of 1 hour. The common theme to all composite membranes is that the change in volume swell is anisotropic in comparison to the isotropic response of the corresponding neat polymers. A perfluorocyclobutane polymer having 137% volume change in boiling water after 1 hour has a reduced total volume swell of 83% after being once imbibed into ePTFE (Donaldson 1326). The anisotropic behavior is evident though the comparison of dimensional change in the planar X and Y, compared to percentage of swell in the through plane Z dimension. Specifically, the neat ionomer blend showed a 13 micron membrane swelling to 18 microns which corresponds to ~35% of the overall volume swell of 137%. The same ionomer in ePTFE (Donaldson 1326) increased from 18 micron thickness to 29 microns, corresponding to ~75% of the total volume swell of 83% accounted for in the thickness direction. Table 1 shows a number of different ionomers and the corresponding dimension change as a result of being imbibed into ePTFE.

TABLE 1

Example of Anisotropic Dimensional Change of ePTFE Supported PEMs

| Polymer Electrolyte | Base PEM Dimension Change | | | | ePTFE Supported PEM Dimension Change | | | |
|---|---|---|---|---|---|---|---|---|
| | X | Y | Z | Vol. Swell | X | Y | Z | Vol. Swell |
| SPFCB Example 1 1.5 IEC | 29% | 33% | 38% | 137% | 2% | 10% | 61% | 80% |
| SPFCB Example 2 1.5 IEC | 22% | 44% | 32% | 132% | 2% | 10% | 53% | 73% |
| SPEEK 1.46 IEC | 233% | 67% | 114% | 1100% | 0% | 33% | 285% | 416% |
| S-Parmax 1.95 IEC | 11% | 11% | 29% | 60% | 4% | 11% | 31% | 52% |
| Nafion ® 1000-1.0 IEC | 24% | 22% | 33% | 102% | 4% | 11% | 30% | 51% |

Figure 3:
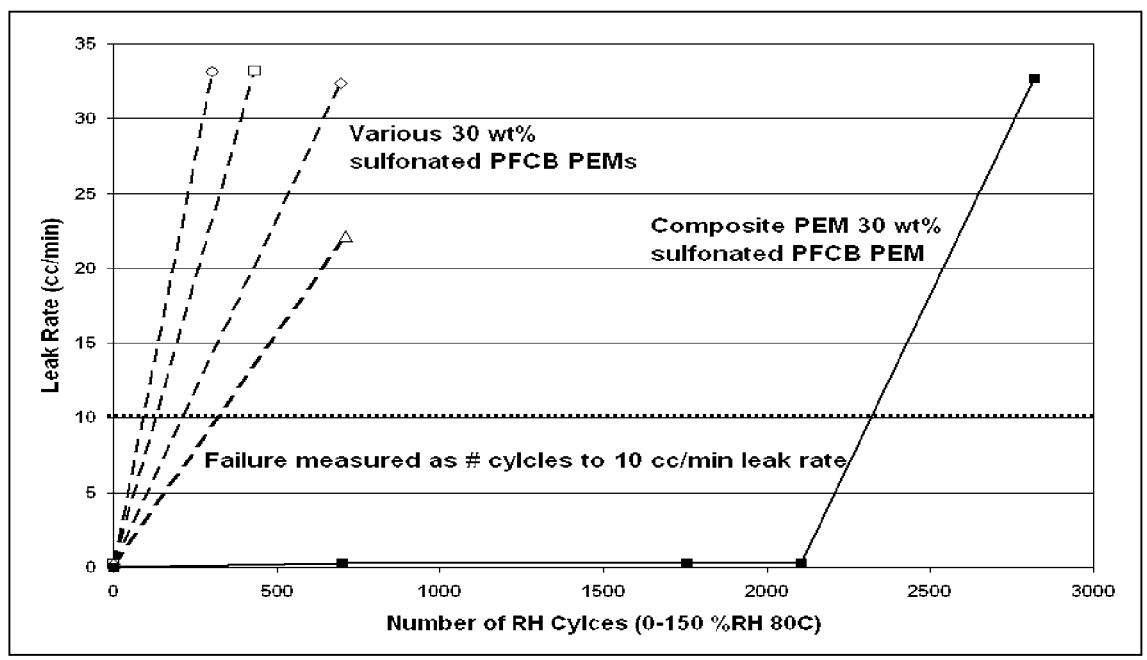
FIG. 3 provides mechanical durability data for embodiments of the present invention.

Accelerated Mechanical Durability. We have shown previously that limiting volume swell in the X-Y planar dimension within the fuel cell, as a result of decreasing hydration and dehydration stresses, leads to improved mechanical durability. We have developed an internal accelerated mechanical durability test that subjects a candidate PEM to extreme hydration-dehydration cycles from 150% RH to 0% RH over 2 minute intervals at 80° C. The membrane durability is quantified by the number of cycles before a 10 ccm crossover leak presents. Our initial work has indicated that sulfonated PFCB membranes containing 30 weight % poly(vinylidene difluoride co-hexafluoropropylene), commercially known as Kynar Flex®, have a threshold limit of 700 cycles to failure. For demonstration purposes, we incorporated one of the 30% Kynar Flex® blended sulfonated PFCB ionomers into ePTFE and subjected the composite membrane to the accelerated durability test. A 4× improvement in accelerated lifetime is demonstrated, reaching 2100-2800 cycles prior to failure. In FIG. 3, the improved mechanical durability of the ePTFE-supported membrane is shown to be 3 to 4 times that of the unsupported membrane in an accelerated mechanical stress test.

Fuel Cell Performance. Through the comparison of a number of sulfonated ionomers there are examples where the fuel cell performance has suffered through the incorporation of ionomer into ePTFE. However, performance here is within 10 mV of the comparative example without the ePTFE support. We have found the incorporation of an appropriate volume swell ionomer in conjunction with the minimum (Kynar Flex®) rubber weight fraction into an optimized porous ePTFE has yielded a very competitive membrane technology. FIG. 3 provides mechanical durability data.

Perfluorocyclobutyl Ionomer Blend in Polytetrafluoroethylene Support Structure.

A 15 wt % solution, in N,N-dimethylacetamide was prepared using a sulfonated segmented block copolymer prepared from the reaction of chlorosulfonic acid with the perfluorocyclobutyl polymer (~90,000 Mw) of a 16,000 Mw biphenyl perfluorocyclobutane oligomer and a hexafluoroisopropylidene-bis-triflurovinyl ether monomer. A blend solution was prepared by adding 3 g of a 15 wt % solution of Kynar Flex® 2751 in N,N-dimethylacetamide to 7 g of the 15 wt % PFCB solution. The solution was thoroughly mixed and diluted with 10 g of isopropyl alcohol with continuous stirring.

The 7.5 wt % solution was then coated on a glass sheet and the ePTFE support was laid-down on top of the wet layer such that the solution was able to penetrate the porous support. The ePTFE structure immediately became transparent and the wet-film was heated at 80° C. on a heated platen for 15 minutes. A second coating of the 7.5 wt % solution was coated on top of the dried supported layer and dried at 80° C. for 15 minutes. The coated glass plate was then transferred to a forced-air oven and then was heated at 130° C. for four hours. The resultant supported membrane film remained transparent and was 15-20 micrometers thick. The supported film was removed from the glass by immersion in water, and then the free-standing, transparent film with ionomer-filled ePTFE layer was used as a polyelectrolyte membrane in a humidified, hydrogen-air fuel cell that was operated at less than 100° C.

The above description of embodiments of the invention is merely exemplary in nature and, thus, variations thereof are not to be regarded as a departure from the spirit and scope of the invention.

What is claimed is:

1. A composite membrane for use in an electrochemical cell, the composite membrane comprising:

a support structure having a predetermined void volume; and a polymeric electrolyte composition contacting the support structure, the polymeric electrolyte composition comprising:

a first polymer comprising a perfluorocyclobutyl moiety; and a second polymer that is different than the first polymer.

2. The composite membrane of claim 1 wherein at least 50 percent of the void volume includes a portion of the polymeric composition.

3. The composite membrane of claim 1 wherein the second polymer is an non-ionic polymer.

4. The composite membrane of claim 3 wherein the non-ionic polymer comprises a fluoropolymer.

5. The composite membrane of claim 1 wherein the second polymer is selected from the group consisting of sulfonated-poly(arylene ether ketone), sulfonated-poly(phenylene), poly(perfluoroalkyl-perfluoroalkylether sulfonic acid), and combinations thereof.

6. The composite membrane of claim 1 wherein the support structure comprises an expanded polytetrafluoroethane.

7. The composite membrane of claim 1 wherein the perfluorocyclobutyl moiety is selected from the group consisting of:

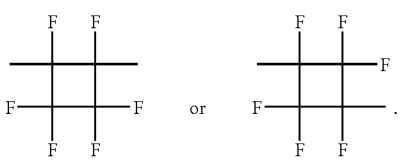

8. The composite membrane of claim 7 wherein the first polymer comprises polymer segments 1 and 2:

$$[E_1(SO_2X)_d]\text{—}P_1\text{-}Q_1\text{-}P_2 \qquad 1$$

$$E_2\text{-}P_3\text{-}Q_2\text{-}P_4 \qquad 2$$

wherein:
$E_1(SO_2X)_d$ is a sulfonated aromatic containing moiety;
$E_1$ is an aromatic containing moiety;
$E_2$ is an unsulfonated aromatic-containing and/or aliphatic-containing moiety;
X is an —OH, a halogen, an ester, or

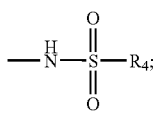

d is the number of $(SO_2X)_d$ attached to $E_1$;
$P_1$, $P_2$, $P_3$, $P_4$ are each independently: absent, —O—, —S—, —SO—, —CO—, —SO$_2$—, —NR$_1$H—, NR$_2$—, or —R$_3$—;
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$, $Q_2$ are each independently a fluorinated cyclobutyl moiety.

9. The composite membrane of claim 7 wherein the first polymer comprises segments 3 and 4:

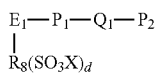

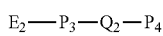

wherein:
$E_1$, $E_2$ are each independently an aromatic-containing and/or aliphatic-containing moiety;
X is an —OH, a halogen, an ester, or

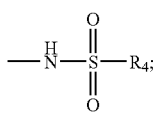

d is the number of $(SO_2X)_d$ attached to $E_1$;
$P_1$, $P_2$, $P_3$, $P_4$ are each independently: absent, —O—, —S—, —SO—, —CO—, —SO$_2$—, —NH—, NR$_2$—, or —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$R_8(SO_2X)_d$ is a sulfonated aliphatic or aromatic containing moiety; and
$Q_1$, $Q_2$ are each independently a fluorinated cyclobutyl moiety.

10. The composite membrane of claim 7 wherein the first polymer comprises segments 5 and 6:

$$E_1(SO_2X)_d\text{—}P_1\text{-}Q_1\text{-}P_2 \qquad 5$$

$$E_2\text{-}P_3\text{-}Q_2\text{-}P_4 \qquad 6$$

connected by a linking group $L_1$ to form polymer units 7 and 8:

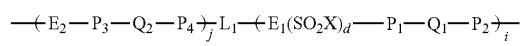

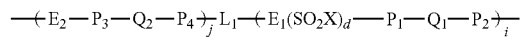

wherein:
$E_1(SO_2X)_d$ is a sulfonated aromatic-containing moiety;
$E_2$ is an unsulfonated aromatic-containing and/or aliphatic-containing moiety;
$L_1$ is a linking group;
X is an —OH, a halogen, an ester, or

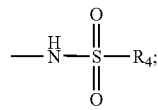

d is a number of $(SO_2X)$ functional groups attached to $E_1$;
$P_1$, $P_2$, $P_3$, $P_4$ are each independently absent, —O—, —S—, —SO—, —SO$_2$—, —CO—, —NH—, NR$_2$—, —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$Q_1$, $Q_2$ are each independently a fluorinated cyclobutyl moiety;
i is a number representing repetition of polymer segment 5; and,
j is a number representing repetition of polymer segment 6.

11. The composite membrane of claim 7 wherein the first polymer comprises polymer segments 9 and 10:

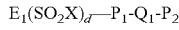

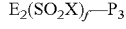

wherein:
$E_1$, $E_2$ is an aromatic or aliphatic-containing moiety wherein at least one of $E_1$ and $E_2$ include an aromatic group substituted with —SO$_2$X;

X is an —OH, a halogen, an ester, or

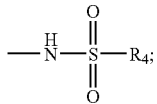

d is the number of (SO$_2$X) functional groups attached to E$_1$;
f is the number of (SO$_2$X) functional groups attached to E$_2$;
P$_1$, P$_2$, P$_3$ are each independently absent, —O—, —S—, —SO—, —SO$_2$—, —CO—, —NH—, NR$_2$—, —R$_3$—, and R$_2$ is C$_{1-25}$ alkyl, C$_{1-25}$ aryl or C$_{1-25}$ arylene;

R$_3$ is C$_{1-25}$ alkylene, C$_{1-25}$ perfluoroalkylene, perfluoroalkyl ether, alkyl ether, or C$_{1-25}$ arylene;

R$_4$ is trifluoromethyl, C$_{1-25}$ alkyl, C$_{1-25}$ perfluoroalkylene, C$_{1-25}$ aryl, or another E$_1$ group; and Q$_1$ is a fluorinated cyclobutyl moiety, with the proviso that when d is greater than zero, f is zero and when f is greater than zero d is zero.

* * * * *